(12) United States Patent
Takahashi et al.

(10) Patent No.: US 10,982,140 B2
(45) Date of Patent: Apr. 20, 2021

(54) NITRIDE PHOSPHOR PARTICLE DISPERSION-TYPE SIALON CERAMIC, FLUORESCENT MEMBER, AND METHOD FOR PRODUCING NITRIDE PHOSPHOR PARTICLE DISPERSION-TYPE SIALON CERAMIC

(71) Applicants: Kanagawa Institute of Industrial Science and Technology, Ebina (JP); National University Corporation YOKOHAMA National University, Yokohama (JP)

(72) Inventors: Takuma Takahashi, Ebina (JP); Junichi Tatami, Yokohama (JP); Ippei Kokubun, Yokohama (JP); Masahiro Yokouchi, Ebina (JP)

(73) Assignees: KANAGAWA INSTITUTE OF INDUSTRIAL SCIENCE AND TECHNOLOGY, Ebina (JP); NATIONAL UNIVERSITY CORPORATION YOKOHAMA NATIONAL UNIVERSITY, Yokohama (JP)

( * ) Notice: Subject to any disclaimer, the term of this patent is extended or adjusted under 35 U.S.C. 154(b) by 177 days.

(21) Appl. No.: 16/328,136

(22) PCT Filed: Aug. 25, 2017

(86) PCT No.: PCT/JP2017/030566
§ 371 (c)(1),
(2) Date: Feb. 25, 2019

(87) PCT Pub. No.: WO2018/038259
PCT Pub. Date: Mar. 1, 2018

(65) Prior Publication Data
US 2019/0185744 A1    Jun. 20, 2019

(30) Foreign Application Priority Data

Aug. 26, 2016 (JP) ............................. JP2016-166201

(51) Int. Cl.
| | | |
|---|---|---|
| C09K 11/64 | (2006.01) | |
| C09K 11/00 | (2006.01) | |
| C09K 11/08 | (2006.01) | |
| C09K 11/77 | (2006.01) | |
| C09K 11/02 | (2006.01) | |
| C04B 35/581 | (2006.01) | |
| C04B 35/584 | (2006.01) | |
| C04B 35/63 | (2006.01) | |

(52) U.S. Cl.
CPC .......... *C09K 11/646* (2013.01); *C04B 35/581* (2013.01); *C04B 35/584* (2013.01); *C04B 35/6303* (2013.01); *C09K 11/00* (2013.01); *C09K 11/02* (2013.01); *C09K 11/08* (2013.01); *C09K 11/0883* (2013.01); *C09K 11/64* (2013.01); *C09K 11/7706* (2013.01); *C09K 11/7721* (2013.01); *C09K 11/7734* (2013.01); *C09K 11/7749* (2013.01); *C09K 11/7758* (2013.01); *C09K 11/7764* (2013.01); *C04B 2235/3205* (2013.01); *C04B 2235/3217* (2013.01); *C04B 2235/3248* (2013.01); *C04B 2235/3418* (2013.01); *C04B 2235/3869* (2013.01); *C04B 2235/3873* (2013.01); *C04B 2235/604* (2013.01)

(58) Field of Classification Search
CPC ... C09K 11/646; C09K 11/02; C09K 11/7706; C09K 11/0883
See application file for complete search history.

(56) References Cited

U.S. PATENT DOCUMENTS

| | | | | |
|---|---|---|---|---|
| 2010/0142181 | A1* | 6/2010 | Schmidt | ................ C04B 35/593 362/84 |
| 2015/0362135 | A1* | 12/2015 | Sugiyama | ............ G03B 21/204 362/84 |
| 2017/0073578 | A1* | 3/2017 | Takahashi | ............. C04B 35/597 |

FOREIGN PATENT DOCUMENTS

| | | |
|---|---|---|
| JP | 2010514189 | 4/2010 |
| JP | 2010538102 | 12/2010 |
| JP | 2016001669 | 1/2016 |
| WO | WO2008/078285 A2 | 7/2008 |
| WO | WO 2013/172025 | 11/2013 |
| WO | WO 2015/133612 | 9/2015 |
| WO | WO 2017/053233 | 3/2017 |

OTHER PUBLICATIONS

PCT International Search Report dated Sep. 20, 2017, PCT Application No. PCT/JP2017/030566, 4 pages.

* cited by examiner

*Primary Examiner* — C Melissa Koslow
(74) *Attorney, Agent, or Firm* — Dority & Manning, P.A.

(57) ABSTRACT

A nitride phosphor particle dispersion-type sialon ceramic of the present invention includes a matrix formed of a sialon-based compound; and at least one nitride phosphor which is dispersed in the matrix and contains a luminescence center element.

5 Claims, 2 Drawing Sheets

NITRIDE PHOSPHOR PARTICLE DISPERSION-TYPE SIALON CERAMIC, FLUORESCENT MEMBER, AND METHOD FOR PRODUCING NITRIDE PHOSPHOR PARTICLE DISPERSION-TYPE SIALON CERAMIC

TECHNICAL FIELD

The present invention relates to a nitride phosphor particle dispersion-type sialon ceramic, a fluorescent member, and a method for producing a nitride phosphor particle dispersion-type sialon ceramic.

Priority is claimed on Japanese Patent Application No. 2016-166201, filed on Aug. 26, 2016, the content of which is incorporated herein by reference.

BACKGROUND ART

In recent years, blue light-emitting diodes (blue LED) have come into practical use and white LEDs using these blue LEDs have been developed. Since white LEDs have lower power consumption than white light sources of the related art and have a long lifetime, white LEDs are used for backlights for liquid crystal display devices and indoor and outdoor lighting equipment.

A white LED includes, for example, a blue LED and a nitride phosphor which is used for coating the surface thereof.

Since the above-described nitride phosphor is powdery, the nitride phosphor is dispersed in a light-transmitting resin and fixed to the surface of a blue LED. In this case, the luminous efficiency of a white LED is degraded due to scattering of light caused by a difference in refractive index between the nitride phosphor and the resin.

It is considered that such a problem can be solved by obtaining a transparent mass (bulk body) formed of only a nitride phosphor. In order to make the mass formed of a nitride phosphor transparent, it is necessary to promote sintering of raw material powder of the nitride phosphor and to remove pores which are present in a sintered body and serve as sources of scattered light. Further, the nitride phosphor has a high refractive index. Accordingly, the transparency of the sintered body is degraded in a case where a glass phase with a low refractive index remains in the sintered body obtained by sintering of the nitride phosphor. However, a method of removing pores from the sintered body formed of a nitride phosphor and a method of preventing a glass phase from remaining in the sintered body formed of a nitride phosphor have not been established.

Meanwhile, a method for producing a nitride phosphor which is a transparent bulk body having fluorescence by adding an appropriate sintering aid to raw material powder of a nitride phosphor and performing an appropriate sintering process has been known (for example, see PTL 1).

CITATION LIST

Patent Literature

[PTL 1] PCT International Publication No. WO2015/133612A

SUMMARY OF INVENTION

Technical Problem

The nitride phosphor of PTL 1 is a sintered body. However, all incident excitation light is absorbed by the nitride phosphor unless the thickness of the sintered body is set to 100 μm or less. As the result, there is a problem in that excitation light cannot be transmitted through the sintered body. In a case where excitation light cannot be transmitted through the sintered body, it is not possible to realize a white LED by means of utilizing the fluorescence emitted by the sintered body and the excitation light which has been transmitted through the sintered body.

Further, in order for the nitride phosphor to exhibit excellent excitation light-transmitting properties, it is necessary to increase the transparency of the nitride phosphor. Therefore, it is necessary to reduce light-emitting sources and absorption sources of the nitride phosphor. However, in a case where the concentration of an activating element is decreased in order to reduce the light-emitting sources and the absorption sources of the nitride phosphor, a problem of a change in light emitting wavelength and a problem of a decrease in quantum efficiency occur.

The present invention has been made in consideration of the above-described circumstances, and an object thereof is to provide a nitride phosphor particle dispersion-type sialon ceramic in which the transmittance of excitation light is improved and a fluorescent member formed of the nitride phosphor particle dispersion-type sialon ceramic. Further, another object of the present invention is to provide a method for producing a nitride phosphor particle dispersion-type sialon ceramic which enables adjustment of the concentration of a nitride phosphor in the nitride phosphor particle dispersion-type sialon ceramic.

Solution to Problem

[1] A nitride phosphor particle dispersion-type sialon ceramic including: a matrix formed of a sialon-based compound; and at least one nitride phosphor which is dispersed in the matrix and contains a luminescence center element.

[2] The nitride phosphor particle dispersion-type sialon ceramic according to [1], in which the sialon-based compound is a nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$).

[3] The nitride phosphor particle dispersion-type sialon ceramic according to [2], in which the nitride is at least one selected from the group consisting of α-sialon represented by Formula $M_x(Si,Al)_{12}(N,O)_{16}$ (here, M represents at least one selected from the group consisting of Li, alkaline earth metals, and rare earth metals, and $0.3 \leq x \leq 2$), β-sialon represented by Formula $(Si,Al)_6(N,O)_8$, and $CaAlSiN_3$ represented by Formula $M_x(Si,Al)_y(N,O)_z$ (here, M represents at least one selected from the group consisting of alkaline earth metals, $0.2 \leq x/z \leq 0.6$, and $0.4 \leq y/z \leq 0.8$).

[4] The nitride phosphor particle dispersion-type sialon ceramic according to [1], in which the nitride phosphor contains a luminescence center element using a nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$) as a matrix.

[5] The nitride phosphor particle dispersion-type sialon ceramic according to [1], in which the nitride phosphor is at least one selected from the group consisting of α-sialon represented by Formula $M_x(Si,Al)_{12}(N,O)_{16}$ (here, M represents at least one selected from the group consisting of Li, alkaline earth metals, and rare earth metals, and $0.3 \leq x \leq 2$), β-sialon represented by Formula $(Si,Al)_6(N,O)_8$, and $CaAlSiN_3$ represented by Formula $M_x(Si,Al)_y(N,O)_z$ (here, M represents at least one selected from the group consisting of alkaline earth metals, $0.2 \leq x/z \leq 0.6$, and $0.4 \leq y/z \leq 0.8$).

[6] The nitride phosphor particle dispersion-type sialon ceramic according to [1], in which the luminescence center element is one selected from the group consisting of Eu, Ce, Mn, Tb, Yb, Dy, Sm, Tm, Pr, Nd, Pm, Ho, Er, Gd, Cr, Sn, Cu, Zn, Ga, Ge, As, Ag, Cd, In, Sb, Au, Hg, Tl, Pb, Bi, and Fe.

[7] A fluorescent member which is formed of the nitride phosphor particle dispersion-type sialon ceramic according to [1].

[8] A fluorescent member according to [7], which is formed by lamination of two or more fluorescent member units formed of the nitride phosphor particle dispersion-type sialon ceramic, in which colors of fluorescences emitted by the two or more fluorescent member units are different from one another.

[9] A method for producing a nitride phosphor particle dispersion-type sialon ceramic, including: a step of performing uniaxial press molding on a mixture which contains raw material powder serving as a sialon-based compound through a reaction and at least one nitride phosphor containing a luminescence center element to prepare a primary molded body; a step of performing cold isostatic press molding on the primary molded body to prepare a secondary molded body; a step of performing pre-sintering on the secondary molded body in a nitrogen atmosphere to prepare a sintered body; and a step of performing a pressure-sintering treatment on the sintered body in a nitrogen atmosphere.

[10] The method for producing a nitride phosphor particle dispersion-type sialon ceramic according to [9], in which at least one selected from the group consisting of rare earth oxides, alkaline earth metal oxides, aluminum oxide, aluminum nitride, silicon oxide, and hafnium oxide is added to the mixture as a sintering aid.

Advantageous Effects of Invention

According to the nitride phosphor particle dispersion-type sialon ceramic of the present invention, it is possible to improve the transparency of excitation light.

According to the method for producing a nitride phosphor particle dispersion-type sialon ceramic of the present invention, it is possible to adjust the concentration of the nitride phosphor in the nitride phosphor particle dispersion-type sialon ceramic.

DESCRIPTION OF EMBODIMENTS

Figure 1:
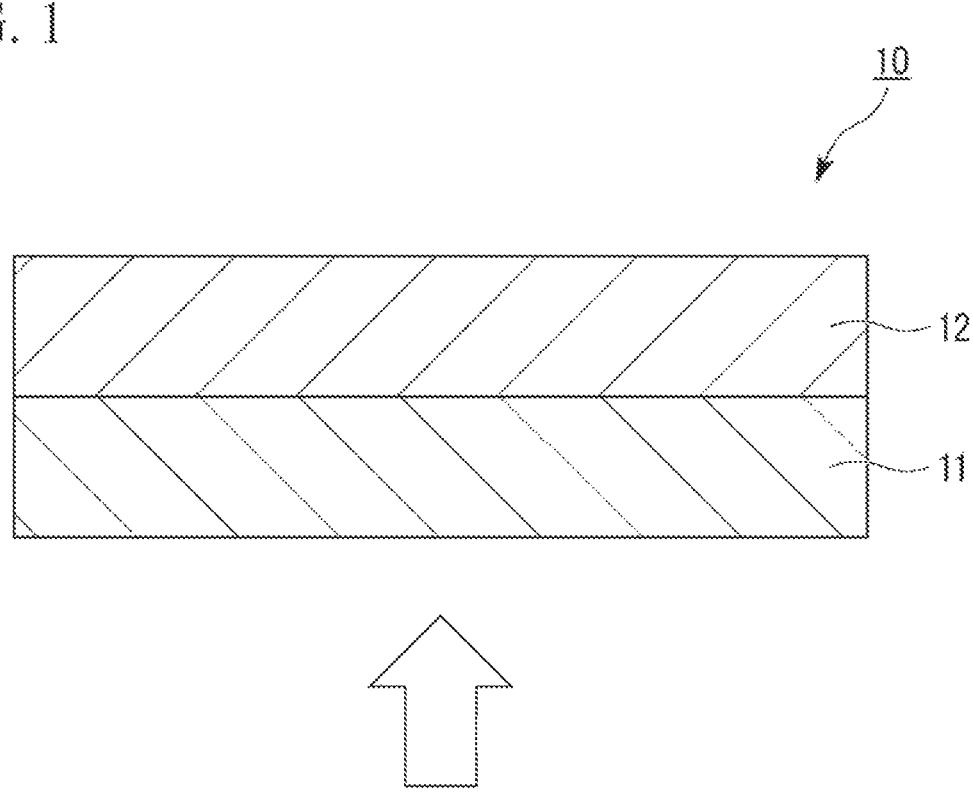
FIG. 1 is a schematic cross-sectional view illustrating an embodiment of a fluorescent member according to the present invention.

Hereinafter, embodiments of a nitride phosphor particle dispersion-type sialon ceramic, a fluorescent member, and a method for producing a nitride phosphor particle dispersion-type sialon ceramic will be described.

Further, the embodiments will be described in detail for better understanding of the scope of the invention and are not intended to limit the present invention unless otherwise noted.

[Nitride Phosphor Particle Dispersion-Type Sialon Ceramic]

A nitride phosphor particle dispersion-type sialon ceramic of the present embodiment includes a matrix formed of a sialon-based compound, and at least one nitride phosphor which is dispersed in the matrix and contains a luminescence center element.

The nitride phosphor particle dispersion-type sialon ceramic of the present embodiment is a sintered body (bulk body) formed by sintering of a raw material containing silicon nitride powder as described below. The nitride phosphor particle dispersion-type sialon ceramic is not particulate (powdery). The nitride phosphor particle dispersion-type sialon ceramic is a polycrystalline body formed by aggregating multiple single crystal particles formed of a sialon-based compound and multiple single crystal particles of a nitride phosphor. In other words, the nitride phosphor particle dispersion-type sialon ceramic is a sintered body having an optional shape. The shape of the sintered body is not particularly limited, and examples thereof include a disc-shape, a flat plate shape, a convex lens shape, a concave lens shape, a spherical shape, a hemispherical shape, a cubic shape, a rectangular parallelepiped shape, a columnar shape such as a prism or a column, and a tubular shape such as a square tube or a cylinder. Further, in the nitride phosphor particle dispersion-type sialon ceramic of the present embodiment, a polycrystalline body formed by aggregating single crystal particles of multiple sialon-based compounds is referred to as a sialon matrix, and nitride phosphor particles are dispersed in the sialon matrix.

For example, in a case where the nitride phosphor particle dispersion-type sialon ceramic of the present embodiment is applied to a white LED, the nitride phosphor particle dispersion-type sialon ceramic is molded in a shape of covering the outer periphery or the upper portion (tip portion) of a blue LED serving as an excitation light source and then used.

The thickness of the nitride phosphor particle dispersion-type sialon ceramic of the present embodiment is not particularly limited. The thickness of the nitride phosphor particle dispersion-type sialon ceramic of the present embodiment is appropriately adjusted according to the target transparency (the total transmittance of excitation light). The thickness of the nitride phosphor particle dispersion-type sialon ceramic of the present embodiment is preferably in a range of 100 µm to 1 mm.

The transparency in the nitride phosphor particle dispersion-type sialon ceramic of the present embodiment is not particularly limited because the transparency is changed depending on the content of the nitride phosphor as described below. The transparency in the nitride phosphor particle dispersion-type sialon ceramic of the present embodiment is not limited as long as the total transmittance of excitation light in a case where a sintered body (bulk body) having a thickness of 100 µm is formed is 10% or greater.

The excitation light in the nitride phosphor particle dispersion-type sialon ceramic of the present embodiment is, for example, light having a wavelength of 300 nm to 500 nm (from light in the ultraviolet region to light in a blue region).

In the nitride phosphor particle dispersion-type sialon ceramic of the present embodiment, the content of the nitride phosphor is not particularly limited. The content of the nitride phosphor in the nitride phosphor particle dispersion-type sialon ceramic of the present embodiment is appropriately adjusted according to the target transparency (the total transmittance of excitation light) and the fluorescence (the fluorescence intensity and the emission wavelength). The content of the nitride phosphor in the nitride phosphor particle dispersion-type sialon ceramic of the present embodiment is, for example, in a range of 0.1% by mass to 99.9% by mass and preferably in a range of 1% by mass to 50% by mass. In a case where the content of the nitride phosphor is set to be in a range of 1% by mass to 50% by mass, the nitride phosphor particle dispersion-type sialon ceramic has excellent transparency and fluorescence.

In the nitride phosphor particle dispersion-type sialon ceramic of the present embodiment, the average particle diameter of single crystal particles of the sialon-based compound constituting the sialon matrix is preferably in a range of 100 nm to 700 nm and more preferably in a range of 200 nm to 500 nm.

In a case where the average particle diameter of the single crystal particles of the sialon-based compound constituting the sialon matrix is 100 nm or greater, excellent thermal mechanical characteristics can be expected. Further, in a case where the average particle diameter of the single crystal particles of the sialon-based compound constituting the sialon matrix is 700 nm or less, high transparency can be expected.

In the nitride phosphor particle dispersion-type sialon ceramic of the present embodiment, the average particle diameter of the single crystal particles of the nitride phosphor is preferably in a range of 500 nm to 30 μm and more preferably in a range of 1 μm to 10 μm.

In a case where the average particle diameter of the single crystal particles of the nitride phosphor is 500 nm or greater, the particles can be uniformly dispersed in the sialon matrix. Further, in a case where the average particle diameter of the single crystal particles of the nitride phosphor is 30 μm or less, excellent fluorescent characteristics can be expected.

In the nitride phosphor particle dispersion-type sialon ceramic of the present embodiment, the average particle diameter of the single crystal particles of the sialon-based compound constituting the sialon matrix and the single crystal particles of the nitride phosphor is measured in the following manner using a linear intercept method in conformity with ISO13383-1:2012.

An observation surface is mirror-polished and subjected to plasma etching so that the crystal particles are clarified to obtain an image of the organization of the crystal particles using a scanning electron microscope. The particle diameter is obtained by drawing a straight line on the obtained image of the organization and measuring the distance of an intersection between the straight line and a particle interface. The measurement of this particle diameter is repeated and the obtained values are averaged to obtain an average particle diameter.

The nitride phosphor particle dispersion-type sialon ceramic of the present embodiment may contain two or more nitride phosphors emitting fluorescences with different colors (different emission wavelengths). In a case where the nitride phosphor particle dispersion-type sialon ceramic of the present embodiment contains two or more nitride phosphors, the content of each nitride phosphor is appropriately adjusted according to the color temperature of light emitted by the nitride phosphor particle dispersion-type sialon ceramic.

For example, an example of the configuration of the nitride phosphor particle dispersion-type sialon ceramic in a case of obtaining white light will be described. In this case, the nitride phosphor particle dispersion-type sialon ceramic is allowed to contain a nitride phosphor that emits red light using blue light and a nitride phosphor that emits green light using blue light. Further, the nitride phosphor particle dispersion-type sialon ceramic is set to have transparency to transmit blue light. In this manner, blue light transmitted through the nitride phosphor particle dispersion-type sialon ceramic and red light and green light emitted from the nitride phosphor particle dispersion-type sialon ceramic are mixed. As the result, white light can be obtained using the nitride phosphor particle dispersion-type sialon ceramic of the present embodiment.

In addition, another example of the configuration of the nitride phosphor particle dispersion-type sialon ceramic in a case of obtaining white light will be described. In this case, the nitride phosphor particle dispersion-type sialon ceramic is allowed to contain a nitride phosphor that emits blue light using ultraviolet light or purple light, a nitride phosphor that emits red light using ultraviolet light or purple light, and a nitride phosphor that emits green light using ultraviolet light or purple light. In this manner, blue light, red light, and green light emitted from the nitride phosphor particle dispersion-type sialon ceramic are mixed. As the result, white light can be obtained using the nitride phosphor particle dispersion-type sialon ceramic of the present embodiment.

In the nitride phosphor particle dispersion-type sialon ceramic of the present embodiment, it is preferable that the sialon-based compound constituting the matrix is a transparent nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$).

In the nitride phosphor particle dispersion-type sialon ceramic of the present embodiment, the total transmittance of excitation light is 50% or greater in a case where a sintered body (bulk body) whose thickness of the sialon matrix formed of only a sialon-based compound is set to 100 μm is obtained.

The nitride phosphor in the nitride phosphor particle dispersion-type sialon ceramic of the present embodiment is a nitride which contains a matrix formed of a nitride represented by represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$) and a luminescence center element contained (present) in the matrix and emits fluorescence.

In the sialon matrix and the nitride phosphor of the nitride phosphor particle dispersion-type sialon ceramic of the present embodiment, it is preferable that the nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$) is at least one selected from the group consisting of α-sialon represented by Formula $M_x(Si,Al)_{12}(N,O)_{16}$ (y=12, z=16, here, M represents at least one selected from the group consisting of Li, alkaline earth metals, and rare earth metals, and $0.3 \leq x \leq 2$), β-sialon represented by Formula $(Si,Al)_6(N,O)_8$, (x=0, y=6, and z=8) and $CaAlSiN_3$ represented by Formula $M_x(Si,Al)_y(N,O)_z$ (here, M represents at least one selected from the group consisting of alkaline earth metals, $0.2 \leq x/z \leq 0.6$, and $0.4 \leq y/z \leq 0.8$). In $CaAlSiN_3$ represented by Formula $M_8(Si,Al)_y(N,O)_z$ (here, M represents at least one selected from the group consisting of alkaline earth metals, $0.2 \leq x/z \leq 0.6$, and $0.4 \leq y/z \leq 0.8$), in a case where M represents Ca, x represents 1, y represents 2, and z represents 3, the nitride is $CaSiAlN_3$. In a case where M represents Ca, x represents 1, y represents 1, and z represents 2, the nitride is $CaSiN_2$. In a case where M represents Ca, x represents 2, y represents 5, and z represents 8, the nitride is $Ca_2Si_5N_8$. In a case where M represents Sr, x represents 1, y represents 28, and z represents 32, the nitride is $SrSi_9Al_{19}ON_{31}$. In a case where M represents Y, x represents 5, y represents 3, and z represents 13, the nitride is $Y_5Si_3O_{12}N$. In a case where M represents Si, x represents 5, y represents 26, and z represents 37, the nitride is $Si_5Al_5Si_{21}N_{35}O_2$.

Formula $M_x(Si,Al)_{12}(N,O)_{16}$ representing α-sialon is also expressed as Formula $M_xSi_{12-(b+c)}Al_{(b+c)}O_cN_{16-c}$ (here, M represents at least one selected from the group consisting of Li, alkaline earth metals, and rare earth metals, $0.3 \leq x \leq 2$, $3.60 \leq b \leq 5.50$, and $0 \leq c \leq 0.30$).

In Formula $M_xSi_{12-(b+c)}Al_{(b+c)}O_cN_{16-c}$, x is preferably in a range of 0.5 to 2. Moreover, in Formula $M_xSi_{12-(b+c)}Al_{(b+c)}O_cN_{16-c}$, b/c is preferably 1.5 or greater.

Formula $(Si,Al)_6(N,O)_8$ representing β-sialon is also expressed as Formula $Si_{6-z}Al_zO_zN_{8-z}$ (here, $0 \leq z \leq 4.2$).

In Formula $Si_{6-z}Al_zO_zN_{8-z}$, z is preferably in a range of 0 to 1 and more preferably in a range of 0.01 to 0.5.

In addition, in Formula $M_x(Si,Al)_y(N,O)_z$, x/z is preferably in a range of 0.2 to 0.6 and y/z is preferably in a range of 0.4 to 0.8. In a case where x represents 1, y represents 2, and z represents 3, the nitride silicon-based compound is $CaSiAlN_3$.

In the nitride phosphor particle dispersion-type sialon ceramic of the present embodiment, the nitride represented by Formula $M_x(Si,Al)_y(N,O)_z$ is not limited thereto. As the nitride represented by Formula $M_x(Si,Al)_y(N,O)_z$, a compound that emits fluorescence by activating a luminescence center element can also be used.

As the luminescence center element contained in the nitride phosphor of the nitride phosphor particle dispersion-type sialon ceramic of the present embodiment, one selected from the group consisting of Eu, Ce, Mn, Tb, Yb, Dy, Sm, Tm, Pr, Nd, Pm, Ho, Er, Gd, Cr, Sn, Cu, Zn, Ga, Ge, As, Ag, Cd, In, Sb, Au, Hg, Tl, Pb, Bi, and Fe is used.

The nitride phosphor of the nitride phosphor particle dispersion-type sialon ceramic of the present embodiment can emit various colors of fluorescences by adjusting the combination of the nitride and the luminescence center element. In this manner, the color tone of the nitride phosphor of the nitride phosphor particle dispersion-type sialon ceramic of the present embodiment can be adjusted.

In the nitride phosphor of the nitride phosphor particle dispersion-type sialon ceramic of the present embodiment, the color of fluorescence which can be emitted is blue to blue-green in a case where the nitride is Y-α-sialon activated by Ce.

In the nitride phosphor of the nitride phosphor particle dispersion-type sialon ceramic of the present embodiment, the color of fluorescence which can be emitted is yellow in a case where the nitride is Ca-α-sialon activated by Eu.

In the nitride phosphor of the nitride phosphor particle dispersion-type sialon ceramic of the present embodiment, the color of fluorescence which can be emitted is green in a case where the nitride is β-sialon activated by Eu.

In the nitride phosphor of the nitride phosphor particle dispersion-type sialon ceramic of the present embodiment, the color of fluorescence which can be emitted is red in a case where the nitride is $CaSiAlN_3$ activated by Eu.

The nitride phosphor particle dispersion-type sialon ceramic of the present embodiment is a mass containing a matrix formed of a sialon-based compound and at least one nitride phosphor which is dispersed in the matrix and contains a luminescence center element. Accordingly, the nitride phosphor particle dispersion-type sialon ceramic of the present embodiment can be molded into a predetermined shape with the form as it is and applied to a white LED. Therefore, according to the nitride phosphor particle dispersion-type sialon ceramic of the present embodiment, it is not necessary for a nitride phosphor to be dispersed in a resin for use as in the related art. As the result, the luminous efficiency of a white LED is not degraded due to scattering of light caused by a difference in refractive index between a nitride phosphor and a resin.

Moreover, the nitride phosphor is uniformly present throughout the entire nitride phosphor particle dispersion-type sialon ceramic of the present embodiment. Accordingly, fluorescence is emitted uniformly without being biased and the total transmittance of excitation light is uniform without being biased in the nitride phosphor particle dispersion-type sialon ceramic of the present embodiment. Therefore, in a case where excitation light is incident on the nitride phosphor particle dispersion-type sialon ceramic of the present embodiment, the excitation light can be transmitted through this nitride phosphor particle dispersion-type sialon ceramic. In this manner, the excitation light transmitted through the nitride phosphor particle dispersion-type sialon ceramic is mixed with the fluorescence emitted from the nitride phosphor particle dispersion-type sialon ceramic. As the result, white light can be obtained using the nitride phosphor particle dispersion-type sialon ceramic.

Further, the nitride phosphor particle dispersion-type sialon ceramic of the present embodiment is produced according to the following production method. As the result, the nitride phosphor particle dispersion-type sialon ceramic of the present embodiment has less pores or glass phases therein. Therefore, in the nitride phosphor particle dispersion-type sialon ceramic of the present embodiment, the degradation of the transparency resulting from the pores or the glass phases is small and light-transmitting properties are excellent.

[Method of Producing Nitride Phosphor Particle Dispersion-Type Sialon Ceramic]

A method for producing the nitride phosphor particle dispersion-type sialon ceramic of the present embodiment includes a step of performing uniaxial press molding on a mixture which contains raw material powder serving as a sialon-based compound through a reaction and at least one nitride phosphor containing a luminescence center element to prepare a primary molded body; a step of performing cold isostatic press molding on the primary molded body to prepare a secondary molded body; a step of performing gas pressure sintering on the secondary molded body in a nitrogen atmosphere to prepare a sintered body; and a step of performing a pressure-sintering treatment on the sintered body in a nitrogen atmosphere.

The method for producing the nitride phosphor particle dispersion-type sialon ceramic of the present embodiment is applied to a case where the sialon-based compound is α-sialon, a case where the sialon-based compound is β-sialon, and a case where the sialon-based compound is $CaAlSiN_3$.

Hereinafter, the method for producing the nitride phosphor particle dispersion-type sialon ceramic of the present embodiment will be described using the case where the sialon-based compound is α-sialon as an example.

[Case where Sialon-Based Compound is Y-α-Sialon]

First, silicon nitride ($Si_3N_4$) powder, aluminum nitride (AlN) powder, yttrium oxide ($Y_2O_3$) powder, and at least one of the above-described nitride phosphors are weighed so as to have a predetermined molar ratio.

Further, the silicon nitride powder, the aluminum nitride powder, and the yttrium oxide powder are raw material powder serving as a sialon-based compound through a reaction, that is, raw material powder serving as a constituent element of a sialon-based compound through a reaction. Further, the aluminum nitride powder and the yttrium oxide powder function as a sintering aid.

The blending ratio between the silicon nitride powder, the aluminum nitride powder, the yttrium oxide powder, and the nitride phosphor is not particularly limited. The blending ratio thereof is appropriately adjusted according to the fluorescence and the transparency of the target nitride phosphor particle dispersion-type sialon ceramic.

The nitride phosphor used in the method for producing the nitride phosphor particle dispersion-type sialon ceramic of the present embodiment is produced in conformity with the production method described in PTL 1 (PCT International Publication No. WO2015/133612A). In other words, the nitride phosphor used in the method for producing the nitride phosphor particle dispersion-type sialon ceramic of the present embodiment is in the form of powder pulverized such that the average particle diameter thereof is set to be in a predetermined range (for example, a range of 500 nm to 30 μm).

Next, a dispersant is added to the raw material powder, and wet mixing is performed in ethanol using a ball mill. In this manner, a slurry containing raw material powder is prepared.

Subsequently, the obtained slurry is heated using a heater such as a mantle heater, and ethanol contained in the slurry is sufficiently evaporated. In this manner, a mixture of raw material powder (mixed powder) is obtained.

Next, two or more sieves with meshes having different opening diameters are used in a stepwise manner, the above-described mixed powder is forcedly passed through these sieves, and the mixed powder having a predetermined particle diameter is granulated.

Subsequently, a sufficiently melted binder such as paraffin, a lubricant such as bis(2-ethylhexyl)phthalate, and a solvent such as cyclohexane are sufficiently stirred and mixed. In this manner, a binder solution is prepared.

Next, the granulated mixed powder is added to the binder solution, the binder solution is mixed into the entire mixed powder such that the binder solution permeates into the entire mixed powder, the mixture is heated, and then the solvent is evaporated.

Subsequently, after the solvent is sufficiently evaporated, the mixed powder is forcedly passed through a sieve with meshes having a predetermined size to obtain granulated powder having a predetermined particle diameter.

Next, a predetermined amount of granulated powder is collected such that the thickness of a molded body after molding using a mold becomes a predetermined size and then the granulated powder is supplied into the mold.

Subsequently, uniaxial press molding is performed at a pressure of 50 MPa for 30 seconds using a uniaxial press molding machine, thereby obtaining a primary molded body.

Next, the obtained primary molded body is chamfered and packed in a vacuum pack.

Subsequently, the primary molded body packed in a vacuum pack is molded by cold isostatic pressing (CIP) once or repeatedly ten times at a pressure of 200 MPa for 1 minute using a cold isostatic pressing device, thereby obtaining a secondary molded body.

Next, the secondary molded body is placed on an alumina boat and heated in an air stream of 70 L/min using an annular resistance furnace. In this manner, the secondary molded body is degreased, and a binder included in the secondary molded body is removed. In the degreasing step, the heating temperature and the heating time of the secondary molded body are set in two stages. In the first stage of heating, the heating temperature is set to 500° C. and the heating time is set to 3 hours. In the second stage of heating, the heating temperature is set to 560° C. and the heating time is set to 3 hours.

Moreover, in order to promote evaporation of a binder or a lubricant included in the secondary molded body to some extent or to prevent carbon from remaining due to thermal decomposition of the binder or the lubricant, it is preferable that the heating temperature of the secondary molded body is set to be in a range of 300° C. to 600° C. and the heating time thereof is set to be in a range of 1 hour to 10 hours.

Next, the degreased secondary molded body is pre-sintered in a nitrogen atmosphere using a multi-purpose high-temperature sintering furnace, thereby obtaining a sintered body.

In order to sinter the secondary molded body, a porous crucible made of $Si_3N_4$, which is prepared by reaction sintering, is disposed in a housing made of carbon. Further, a porous column plate made of $Si_3N_4$ is disposed in the crucible, and the secondary molded body is disposed on the column plate.

In this sintering step, the sintering temperature of the secondary molded body is set to be in a range of 1500° C. to 1700° C. and the sintering time is set to be in a range of 1 hour to 6 hours. Further, the pressure at the time of sintering in a nitrogen atmosphere is set to 0.9 MPa.

Next, after the sintering is finished, the sintered body is left to be naturally cooled to room temperature and then cooled.

Subsequently, the sintered body is subjected to a pressure-sintering treatment at a pressure of 50 MPa to 200 MPa in a temperature range of 1600° C. to 1800° C. for 1 hour to 4 hours in a nitrogen atmosphere using a hot isostatic pressing (HIP) device.

In this manner, the nitride phosphor particle dispersion-type sialon ceramic of the present embodiment is obtained.

According to the method for producing the nitride phosphor particle dispersion-type sialon ceramic of the present embodiment, a step of performing uniaxial press molding on a mixture which contains raw material powder serving as a sialon-based compound through a reaction and at least one nitride phosphor containing a luminescence center element to prepare a primary molded body is performed. In this manner, the concentration of the nitride phosphor in the nitride phosphor particle dispersion-type sialon ceramic can be adjusted. In addition, according to the method for producing the nitride phosphor particle dispersion-type sialon ceramic of the present embodiment, a step of performing cold isostatic press molding on the primary molded body to prepare a secondary molded body; a step of performing pre-sintering on the secondary molded body in a nitrogen atmosphere to prepare a sintered body; and a step of performing a pressure-sintering treatment on the sintered body in a nitrogen atmosphere are performed. In this manner, it is possible to remove a region having a different refractive index and serving as a source of scattered light and a glass phase serving as a light absorbing source, from the sintered body. As the result, the nitride phosphor is uniformly present throughout the entire nitride phosphor particle dispersion-type sialon ceramic to be obtained. Accordingly, fluorescence is emitted uniformly without being biased and the total transmittance of excitation light is uniform without being biased in the nitride phosphor particle dispersion-type sialon ceramic. Further, the nitride phosphor particle dispersion-type sialon ceramic has less pores or glass phases therein. Therefore, in the nitride phosphor particle dispersion-type sialon ceramic, the degradation of the transparency resulting from the pores or the glass phases is small and light-transmitting properties are excellent.

[Case where Sialon-Based Compound is Ca-α-Sialon]

First, silicon nitride ($Si_3N_4$) powder, aluminum nitride (AlN) powder, calcium carbonate ($CaCO_3$) powder, and at least one of the above-described nitride phosphors are weighed so as to have a predetermined molar ratio.

Further, the silicon nitride powder, the aluminum nitride powder, and the calcium carbonate powder are raw material powder serving as a sialon-based compound through a reaction, that is, raw material powder serving as a constituent element of a sialon-based compound through a reaction. Further, the aluminum nitride powder and the yttrium oxide powder function as a sintering aid.

The blending ratio between the silicon nitride powder, the aluminum nitride powder, the calcium carbonate powder, and the nitride phosphor is not particularly limited and appropriately adjusted according to the fluorescence and the transparency of the target nitride phosphor particle dispersion-type sialon ceramic.

As the nitride phosphor used in the present embodiment, the same nitride phosphor as in the case where the sialon-based compound is Y-α-sialon is used.

Hereinafter, the nitride phosphor particle dispersion-type sialon ceramic of the present embodiment is obtained in the same manner as in the case where the sialon-based compound is Y-α-sialon.

According to the method for producing the nitride phosphor particle dispersion-type sialon ceramic of the present embodiment, a step of performing uniaxial press molding on a mixture which contains raw material powder serving as a sialon-based compound through a reaction and at least one nitride phosphor containing a luminescence center element to prepare a primary molded body is performed. In this manner, the concentration of the nitride phosphor in the nitride phosphor particle dispersion-type sialon ceramic can be adjusted. In addition, according to the method for producing the nitride phosphor particle dispersion-type sialon ceramic of the present embodiment, a step of performing cold isostatic press molding on the primary molded body to prepare a secondary molded body; a step of performing pre-sintering on the secondary molded body in a nitrogen atmosphere to prepare a sintered body; and a step of performing a pressure-sintering treatment on the sintered body in a nitrogen atmosphere are performed. In this manner, it is possible to remove a region having a different refractive index and serving as a source of scattered light and a glass phase serving as a light absorbing source, from the sintered body. As the result, the nitride phosphor is uniformly present throughout the entire nitride phosphor particle dispersion-type sialon ceramic to be obtained. Accordingly, fluorescence is emitted uniformly without being biased and the total transmittance of excitation light is uniform without being biased in the nitride phosphor particle dispersion-type sialon ceramic. Further, the nitride phosphor particle dispersion-type sialon ceramic has less pores or glass phases therein. Therefore, in the nitride phosphor particle dispersion-type sialon ceramic, the degradation of the transparency resulting from the pores or the glass phases is small and light-transmitting properties are excellent.

According to the method for producing the nitride phosphor particle dispersion-type sialon ceramic of the present embodiment, as a sintering aid, at least one selected from the group consisting of rare earth oxides, alkaline earth metal oxides, aluminum oxide, aluminum nitride, silicon oxide, and hafnium oxide may be added to the mixture which contains raw material powder serving as a sialon-based compound through a reaction and at least one nitride phosphor containing a luminescence center element.

The nitride phosphor particle dispersion-type sialon ceramic of the present embodiment is suitably used for applications requiring long-term high luminance light emission such as a high luminance light-emitting diode (LED), an outdoor lamp, a surgical illumination, a light projector, a projector, and an illumination for plants. Further, the nitride phosphor particle dispersion-type sialon ceramic of the present embodiment can also be applied to a light-emitting device such as a scintillator or a laser, a display device such as a television or a display for a personal computer, and a sensor.

In the related art, a nitride phosphor is used by being dispersed in a light-transmitting resin and being fixed to a surface of an LED serving as an excitation light source. Therefore, the heat resistance of an LED or the like to which the nitride phosphor of the related art has been applied depends on the heat resistance of a light-transmitting resin. In other words, the LED or the like to which the nitride phosphor of the related art has been applied has low heat resistance and is not suitable for use in a high temperature environment. Meanwhile, in a case where the nitride phosphor particle dispersion-type sialon ceramic of the present embodiment is applied to a white LED, the nitride phosphor particle dispersion-type sialon ceramic can be used by being molded in a shape of covering the outer periphery or the upper portion (tip portion) of an excitation light source such as a blue LED or a blue laser. Further, the nitride phosphor particle dispersion-type sialon ceramic of the present embodiment does not include a resin at all. Accordingly, a white LED to which the nitride phosphor particle dispersion-type sialon ceramic of the present embodiment has been applied has high heat resistance and can withstand use in a high temperature environment.

Further, in the nitride phosphor particle dispersion-type sialon ceramic of the present embodiment, quenching caused by an increase in temperature is extremely small, and a light-emitting device with excellent color rendering properties or the like can be realized.

[Fluorescent Member]

A fluorescent member of the present embodiment is formed of the nitride phosphor particle dispersion-type sialon ceramic of the present embodiment.

Examples of the fluorescent member of the present embodiment include a fluorescent plate.

The fluorescent member of the present embodiment may be formed by lamination of two or more fluorescent member units formed of the nitride phosphor particle dispersion-type sialon ceramic of the present embodiment. In this case, the colors of the fluorescences respectively emitted by two or more fluorescent member units are different from one another.

Here, FIG. 1 illustrates an example of the fluorescent member of the present embodiment.

A fluorescent member 10 of the present embodiment is formed by, for example, lamination of a first fluorescent member unit 11 and a second fluorescent member unit 12 in this order as illustrated in FIG. 1.

The first fluorescent member unit 11 is, for example, a fluorescent plate which contains a nitride phosphor that emits red light (hereinafter, also referred to as a "red nitride phosphor"), has transparency to transmit blue light serving as excitation light, and is formed of the nitride phosphor particle dispersion-type sialon ceramic. The second fluorescent member unit 12 is, for example, a fluorescent plate which contains a nitride phosphor that emits green light (hereinafter, also referred to as a "green nitride phosphor"), has transparency to transmit blue light and red light serving as excitation light, and is formed of the nitride phosphor particle dispersion-type sialon ceramic.

In a case where blue light serving as excitation light is incident from the first fluorescent member unit 11 side (from the bottom side of the figure) to such a fluorescent member 10, at least a part of the blue light excites the red nitride phosphor contained in the first fluorescent member unit 11, and red light is emitted from the red nitride phosphor. The red light is incident on the second fluorescent member unit 12. Further, the blue light that does not contribute to the excitation of the red nitride phosphor is transmitted through the first fluorescent member unit 11 and is incident on the second fluorescent member unit 12.

Next, at least a part of the blue light which has been incident on the second fluorescent member unit 12 excites the green nitride phosphor contained in the second fluorescent member unit 12, and green light is emitted from the green nitride phosphor and then exited outside (the upper side of the figure) the fluorescent member unit 12. Further, the red light which has been incident on the second fluorescent member unit 12 is transmitted through the second fluorescent member unit 12 and exited outside (the upper side of the figure) the second fluorescent member unit 12. Further, the blue light that does not contribute to the excitation of the green nitride phosphor is transmitted through the second fluorescent member unit 12 and exited outside (the upper side of the figure) the second fluorescent member unit 12. In this manner, the blue light, the red light, and the green light are mixed so that white light can be obtained using the fluorescent member 10.

EXAMPLES

Hereinafter, the present invention will be described in more detail with reference to experiment examples, but the present invention is not limited to the following experiment examples.

Experiment Example 1

(Production of Nitride Phosphor Particle Dispersion-Type Sialon Ceramic)

First, silicon nitride ($Si_3N_4$) powder (trade name: SN-E10, manufactured by UBE INDUSTRIES, LTD., purity >98%, average particle diameter: 0.6 μm), aluminum nitride (AlN) powder (manufactured by Tokuyama Corporation, F grade, purity >98%, average particle diameter: 1.29 μm), and $CaCO_3$ (manufactured by Junsei Chemical Co., Ltd.) were weighed such that the molar ratio thereof was set to 3:3:1 ($Si_3N_4$:AlN:$CaCO_3$).

Next, 1 part by mass of Ca-α sialon (Ca-α SiAlON:$Eu^{2+}$) particles activated by Eu were added to the mixed powder with respect to the total amount (100 parts by mass) of the mixed powder. Further, as the Ca-α SiAlON:$Eu^{2+}$ particles, those produced according to the production method described in PTL 1 (PCT International Publication No. WO2015/133612A) were used.

Next, 2% by mass of a dispersant (trade name: SERNA E503, manufactured by CHUKYO YUSHI CO., LTD., polyacrylic acid) was added to the raw material powder with respect to the total amount of the raw material powder, wet mixing was performed in ethanol at a rotation speed of 110 rpm for 48 hours using a ball mill (pot: made of silicon nitride, internal volume: 400 mL, sialon ball: particle diameter of 5 mm, 1400 pieces). In this manner, a slurry containing raw material powder was prepared.

Subsequently, the obtained slurry was heated using a heater such as a mantle heater and ethanol contained in the slurry was sufficiently evaporated. In this manner, a mixture of raw material powder (mixed powder) was obtained.

Next, a #32 sieve (nominal dimension: 500 μm) and a #48 sieve (nominal dimension: 300 μm) were used in this order, the above-described mixed powder was forcedly passed through these sieves, and the mixed powder having a predetermined particle diameter was granulated.

Subsequently, sufficiently melted paraffin (manufactured by Junsei Chemical Co., Ltd., melting point of 46° C. to 48° C.) as a binder, bis(2-ethylhexyl)phthalate (manufactured by Wako Pure Chemical Industries, Ltd., purity of 97.0%) as a lubricant, and cyclohexane (manufactured by Wako Pure Chemical Industries, Ltd., purity of 99.5%) as a solvent were sufficiently stirred and mixed. In this manner, a binder solution was prepared. Here, the amount of paraffin to be added was set to 4% by mass and the amount of bis(2-ethylhexyl)phthalate to be added was set to 2% by mass with respect to the total amount of raw material powder. Further, the amount of cyclohexane to be added was set to 35 mL/100 g.

Next, the granulated mixed powder was added to the binder solution, the binder solution was mixed into the entire mixed powder such that the binder solution permeated into the entire mixed powder, the mixture was heated, and then the solvent was evaporated.

Subsequently, after the solvent was sufficiently evaporated, the mixed powder was forcedly passed through a #60 sieve (nominal dimension: 250 μm) and then granulated powder having a predetermined particle diameter was obtained.

Next, 0.7 g of granulated powder was collected such that the thickness of a molded body after molding using a stainless steel mold in a cylindrical shape having a diameter of 15 mm became 2 mm and then the granulated powder was supplied into the mold.

Subsequently, uniaxial press molding was performed at a pressure of 500 MPa for 30 seconds using a uniaxial press molding machine (trade name: MP-500H, manufactured by MARUTO INSTRUMENT CO., LTD.). In this manner, a primary molded body was obtained.

Next, the obtained primary molded body was chamfered and packed in a vacuum pack.

Subsequently, the primary molded body packed in a vacuum pack was molded by cold isostatic pressing once at a pressure of 200 MPa for 60 seconds using a cold isostatic pressing device (trade name: SE-HANDY CIP50-2000, manufactured by Applied Power Japan, Ltd.). In this manner, a secondary molded body was obtained.

Next, the secondary molded body was placed on an alumina boat, heated in an air stream of 70 L/min using a tabular resistance furnace, and degreased. In this manner, a binder included in the secondary molded body was removed. In the degreasing step, heating was carried out at 500° C. for 3 hours and at 560° C. for 3 hours.

Moreover, in order to promote evaporation of a binder or a lubricant included in the secondary molded body to some extent or to prevent carbon from remaining due to thermal decomposition of the binder or the lubricant, the secondary molded body was heated at 250° C. for 3 hours.

Next, the degreased secondary molded body was pre-sintered in a nitrogen atmosphere using a multi-purpose high-temperature sintering furnace (trade name: HIGH MULTI 5000, manufactured by Fujidempa Kogyo Co., Ltd.), thereby obtaining a sintered body.

In order to sinter the secondary molded body, a porous crucible made of $Si_3N_4$, which was prepared by reaction sintering, was disposed in a housing made of carbon, a porous column plate made of $Si_3N_4$ was disposed in the crucible, and the secondary molded body was disposed on the column plate.

In this sintering step, the sintering temperature of the secondary molded body was set to 1600° C. and the sintering time was set to 4 hours. Further, the pressure at the time of sintering was set to 0.9 MPa in a nitrogen atmosphere.

Next, after the sintering was finished, the sintered body was left to be naturally cooled to room temperature and then cooled.

Subsequently, the sintered body was subjected to a pressure-sintering treatment at a pressure of 100 MPa and 1600° C. for 1 hour in a nitrogen atmosphere using a hot isostatic pressing processing device (trade name: SYSTEM15X, manufactured by KOBE STEEL LTD.). In this manner, a nitride phosphor particle dispersion-type sialon ceramic ($Eu^{2+}$ activated Ca-α-SiAlON dispersion-type Ca-α-SiAlON) of Experiment Example 1 was obtained.

Further, the shape of the nitride phosphor particle dispersion-type sialon ceramic of Experiment Example 1 was columnar. Further, the nitride phosphor particle dispersion-type sialon ceramic of Experiment Example 1 was thinned by machining and the final thickness of the nitride phosphor particle dispersion-type sialon ceramic was set to 100 μm. While the nitride phosphor particle dispersion-type sialon ceramic was thinned, both-sided mirror polishing was performed.

(Measurement of Transmittance)

With respect to the nitride phosphor particle dispersion-type sialon ceramic of Experiment Example 1, the total transmittances of ultraviolet light (wavelength of 380 nm) and blue light (wavelength of 440 nm) were measured. The results are listed in Table 1.

The total transmittances of ultraviolet light and blue light were measured by fixing a sample having a thickness of 100 μm to a jig with tape using LAMBDA 750 (manufactured by Perkin Elmer Co., Ltd.). Further, Table 1 does not show the nitride phosphor, but shows relative values in a case where the total transmittance of the sialon ceramic formed of only a sialon-based compound was set to 100%.

Based on the results of Table 1, it was found that the total transmittances of the ultraviolet light and the blue light in the nitride phosphor particle dispersion-type sialon ceramic of Experiment Example 1 were decreased as the content of the nitride phosphor was increased.

(Measurement of Emission Spectrum and Excitation Spectrum)

With respect to the nitride phosphor particle dispersion-type sialon ceramic of Experiment Example 1, the emission spectrum and the excitation spectrum were measured.

In measurement of the emission spectrum and the excitation spectrum, the measurement wavelength region was set such that the emission spectrum was excited at 405 nm and was in a range of 430 nm to 700 nm and the excitation spectrum was excited at 540 nm and was in a range of 280 nm to 500 nm (under a 270 nm cut-off filter) using FP6300 (manufactured by Jasco Corporation). The results thereof are shown in FIG. 2.

Figure 2:
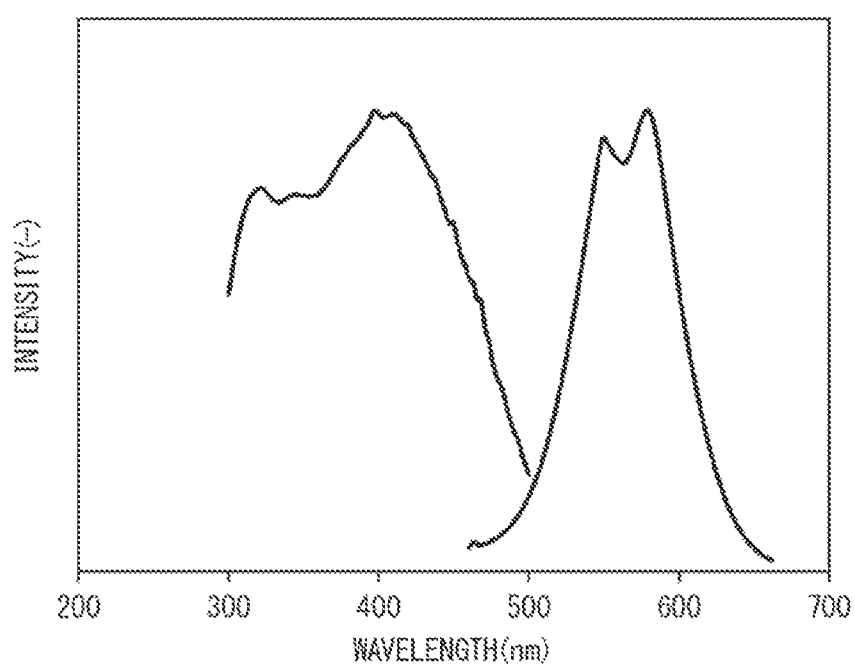
FIG. 2 is a graph showing the results obtained by measuring an emission spectrum and an excitation spectrum in a nitride phosphor particle dispersion-type sialon ceramic of Experiment Example 1.

Based on the results of FIG. 2, it was found that the nitride phosphor particle dispersion-type sialon ceramic of Experiment Example 1 emitted light at 579 nm.

(Evaluation of Heat Resistance)

The nitride phosphor particle dispersion-type sialon ceramic of Experiment Example 1 and an epoxy resin (trade name: jER807, manufactured by Mitsubishi Chemical Corporation) containing commercially available phosphor powder (trade name: STANDARD PHOSPHOR, manufactured by Sialon Co., Ltd.) were heated at 250° C. for 3 hours.

Before and after the heating, the total transmittances of the nitride phosphor particle dispersion-type sialon ceramic (thickness of 100 μm) of Experiment Example 1 and the epoxy resin (thickness of 100 μm) containing commercially available phosphor powder were measured. Further, the appearances thereof were visually observed.

As the result, the total transmittance and the appearance of the nitride phosphor particle dispersion-type sialon ceramic of Experiment Example 1 were not changed before and after the heating. Meanwhile, the total transmittance and the appearance of the epoxy resin containing commercially available phosphor powder were changed before and after the heating.

Experiment Example 2

(Production of Nitride Phosphor Particle Dispersion-Type Sialon Ceramic)

Silicon nitride ($Si_3N_4$) powder (trade name: SN-E10, manufactured by UBE INDUSTRIES, LTD., purity >98%, average particle diameter: 0.6 μm), aluminum nitride (AlN) powder (manufactured by Tokuyama Corporation, F grade, purity >98%, average particle diameter: 1.29 μm), and yttrium (III) oxide ($Y_2O_3$) (trade name: RU-P, manufactured by Shin-Etsu Chemical Co., Ltd., purity >99.9%, average particle diameter: 1.1 μm) were weighed such that the molar ratio thereof was set to 21:9:1 (=$Si_3N_4$:AlN:$Y_2O_3$).

Next, 1 part by mass of β-sialon (β-SiAlON:$Eu^{2+}$) particles activated by Eu were added to the mixed powder with respect to the total amount (100 parts by mass) of the mixed powder. Further, as the β-SiAlON:$Eu^{2+}$ particles, those produced according to the production method described in PTL 1 (PCT International Publication No. WO2015/133612A) were used.

A nitride phosphor particle dispersion-type sialon ceramic ($Eu^{2+}$ activated β-SiAlON dispersion-type Y-α-SiAlON) of Experiment Example 2 was obtained in the same manner as in Experiment Example 1 except for the description above.

(Observation of Nitride Phosphor Particle Dispersion-Type Sialon Ceramic)

Figure 3:
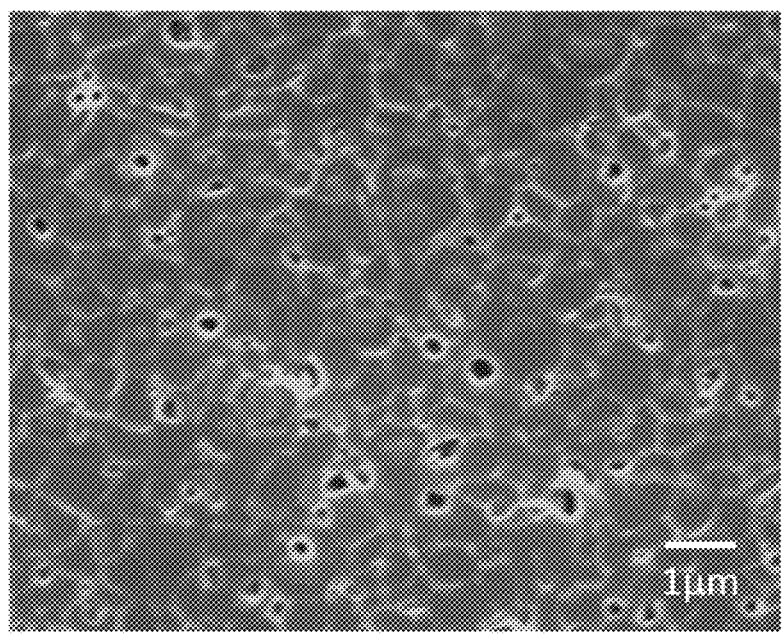
FIG. 3 is a scanning electron microscope image showing the particle form of a nitride phosphor particle dispersion-type sialon ceramic of Experiment Example 2.

The particle form of the nitride phosphor particle dispersion-type sialon ceramic of Experiment Example 2 was observed using a scanning electron microscope (SEM, trade name: JSM-6390LV, manufactured by JEOL, Ltd.). The results are shown in FIG. 3.

(Measurement of Transmittance)

With respect to the nitride phosphor particle dispersion-type sialon ceramic of Experiment Example 2, the total transmittance was measured in the same manner as in Experiment Example 1. The results are listed in Table 1.

Based on the results of Table 1, it was found that the total transmittances of the ultraviolet light and the blue light in the nitride phosphor particle dispersion-type sialon ceramic of Experiment Example 2 were decreased as the content of the nitride phosphor was increased.

(Measurement of Emission Spectrum and Excitation Spectrum)

With respect to the nitride phosphor particle dispersion-type sialon ceramic of Experiment Example 2, the emission spectrum and the excitation spectrum were measured.

In measurement of the emission spectrum and the excitation spectrum, the measurement wavelength region was set such that the emission spectrum was excited at 405 nm and was in a range of 430 nm to 700 nm and the excitation spectrum was excited at 540 nm and was in a range of 280 nm to 500 nm (under a 270 nm cut-off filter) using FP6300 (manufactured by Jasco Corporation). The results thereof are shown in FIG. 4.

Figure 4:
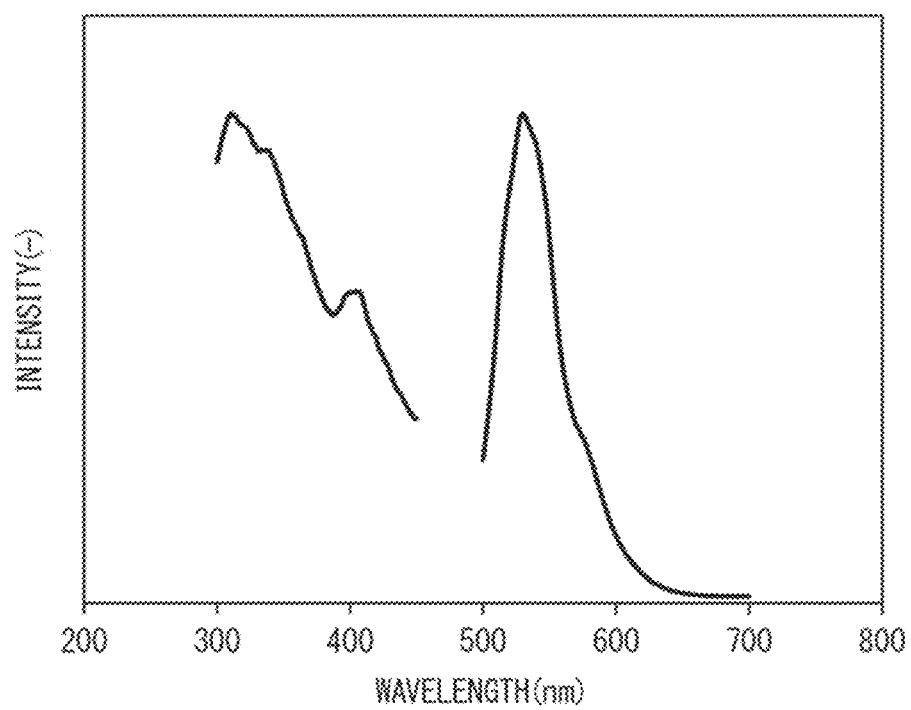
FIG. 4 is a graph showing the results obtained by measuring an emission spectrum and an excitation spectrum in the nitride phosphor particle dispersion-type sialon ceramic of Experiment Example 2.

Based on the results of FIG. 4, it was found that the nitride phosphor particle dispersion-type sialon ceramic of Experiment Example 2 emitted light at 529 nm.

Experiment Example 3

(Production of Nitride Phosphor Particle Dispersion-Type Sialon Ceramic)

Silicon nitride ($Si_3N_4$) powder (trade name: SN-E10, manufactured by UBE INDUSTRIES, LTD., purity >98%, average particle diameter: 0.6 μm), aluminum nitride (AlN) powder (manufactured by Tokuyama Corporation, H grade, purity >98%, average particle diameter: 1.29 μm), and calcium nitride ($Ca_3N_2$) (manufactured by SIGMA-ALDLICH Corporation) were weighed such that the molar ratio thereof was set to 1:1:0.016:0.984 (=Si:Al:Eu:Ca).

Next, 1 part by mass of $CaAlSiN_3$ ($CaAlSiN_3$:$Eu^{2+}$) particles activated by Eu were added to the mixed powder with respect to the total amount (100 parts by mass) of the mixed powder. Further, as the $CaAlSiN_3$:$Eu^{2+}$ particles, those produced according to the production method described in PTL 1 (PCT International Publication No. WO2015/133612A) were used.

A nitride phosphor particle dispersion-type sialon ceramic ($Eu^{2+}$ activated $CaAlSiN_3$ dispersion-type $CaAlSiN_3$) of Experiment Example 3 was obtained in the same manner as in Experiment Example 1 except for the description above.

(Measurement of Transmittance)

With respect to the nitride phosphor particle dispersion-type sialon ceramic of Experiment Example 3, the total transmittance was measured in the same manner as in Experiment Example 1. The results are listed in Table 1.

Based on the results of Table 1, it was found that the total transmittances of the ultraviolet light and the blue light in the nitride phosphor particle dispersion-type sialon ceramic of Experiment Example 3 were decreased as the content of the nitride phosphor was increased.

TABLE 1

|  |  |  | Content of sialon phosphor [part(s) by mass] | | | | | | | | |
|---|---|---|---|---|---|---|---|---|---|---|---|
|  |  |  | 0 | 1 | 5 | 10 | 20 | 30 | 40 | 50 | 100 |
| Experiment Example 1 | Relative value of total transmittance [%] | Ultraviolet light: 380 nm | 100 | 89 | 56 | 31 | 10 | 3 | 1 | 0.3 | 0 |
|  |  | Blue light: 440 nm | 100 | 90 | 59 | 34 | 12 | 4 | 1 | 0.5 | 0 |
| Experiment Example 2 |  | Ultraviolet light: 380 nm | 100 | 93 | 70 | 49 | 24 | 12 | 6 | 3 | 0 |
|  |  | Blue light: 440 nm | 100 | 95 | 77 | 59 | 34 | 20 | 12 | 7 | 0 |
| Experiment Example 3 |  | Ultraviolet light: 380 nm | 100 | 85 | 44 | 20 | 4 | 0.7 | 0.2 | 0 | 0 |
|  |  | Blue light: 440 nm | 100 | 90 | 59 | 35 | 12 | 4 | 2 | 0.5 | 0 |

INDUSTRIAL APPLICABILITY

According to the present invention, it is possible to obtain a nitride phosphor particle dispersion-type sialon ceramic which can be applied to a white LED by being molded into a predetermined shape with the form as it is. Further, according to the present invention, it is possible to obtain a nitride phosphor particle dispersion-type sialon ceramic which does not need to be used by dispersing the nitride phosphor in a resin as in the related art. Therefore, according to the present invention, it is possible to obtain a nitride phosphor particle dispersion-type sialon ceramic which has excellent heat resistance and a long lifetime and in which the luminous efficiency of a white LED is not degraded. Accordingly, the present invention is extremely useful.

REFERENCE SIGNS LIST

10: fluorescent member
11: first fluorescent member unit
12: second fluorescent member unit

The invention claimed is:

1. A nitride phosphor particle dispersion-type sialon ceramic produced by a method comprising:
   a step of performing uniaxial press molding on a mixture which contains raw material powder serving as a sialon-based compound through a reaction and at least one nitride phosphor containing a luminescence center element to prepare a primary molded body;
   a step of performing cold isostatic press molding on the primary molded body to prepare a secondary molded body;
   a step of performing pre-sintering on the secondary molded body in a nitrogen atmosphere to prepare a sintered body; and a step of performing a pressure-sintering treatment on the sintered body in a nitrogen atmosphere, nitride phosphor particle dispersion-type sialon ceramic comprising:

a matrix formed of a sialon-based compound; and at least one nitride phosphor which is dispersed in the matrix and contains a luminescence center element, wherein the sialon-based compound is a nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$), and wherein the nitride phosphor contains a luminescence center element using a nitride represented by Formula $M_x(Si,Al)_y(N,O)_z$ (here, M represents at least one selected from the group consisting of Li, alkaline earth metals, and rare earth metals, $0 \leq x/z < 3$, and $0 < y/z < 1$) as a matrix, and the total transmittance of light having a wavelength of 300 nm to 500 nm in a case where a sintered body having a thickness of 100 pin is formed is 10% or greater.

2. The nitride phosphor particle dispersion-type sialon ceramic according to claim 1, wherein the nitride phosphor is at least one selected from the group consisting of α-sialon represented by Formula $M_x(Si,Al)_{12}(N,O)_{16}$ (here, M represents at least one selected from the group consisting of Li, alkaline earth metals, and rare earth metals, and $0.3 \leq x \leq 2$), β-sialon represented by Formula $(Si,Al)_6(N,O)_8$, and $CaAlSiN_3$ represented by Formula $M_x(Si,Al)_y(N,O)_z$ (here, M represents at least one selected from the group consisting of alkaline earth metals, $0.2 \leq x/z \leq 0.6$, and $0.4 \leq y/z \leq 0.8$).

3. The nitride phosphor particle dispersion-type sialon ceramic according to claim 1, wherein the luminescence center element is one selected from the group consisting of Eu, Ce, Mn, Tb, Yb, Dy, Sm, Tm, Pr, Nd, Pm, Ho, Er, Gd, Cr, Sn, Cu, Zn, Ga, Ge, As, Ag, Cd, In, Sb, Au, Hg, Tl, Pb, Bi, and Fe.

4. A fluorescent member which is formed of the nitride phosphor particle dispersion-type sialon ceramic according to claim 1.

5. A fluorescent member according to claim 4, which is formed by lamination of two or more fluorescent member units formed of the nitride phosphor particle dispersion-type sialon ceramic, wherein colors of fluorescences emitted by the two or more fluorescent member units are different from one another.

* * * * *